F. L. ELDER.
STEERING MECHANISM.
APPLICATION FILED FEB. 24, 1912.
1,050,114.
Patented Jan. 14, 1913.
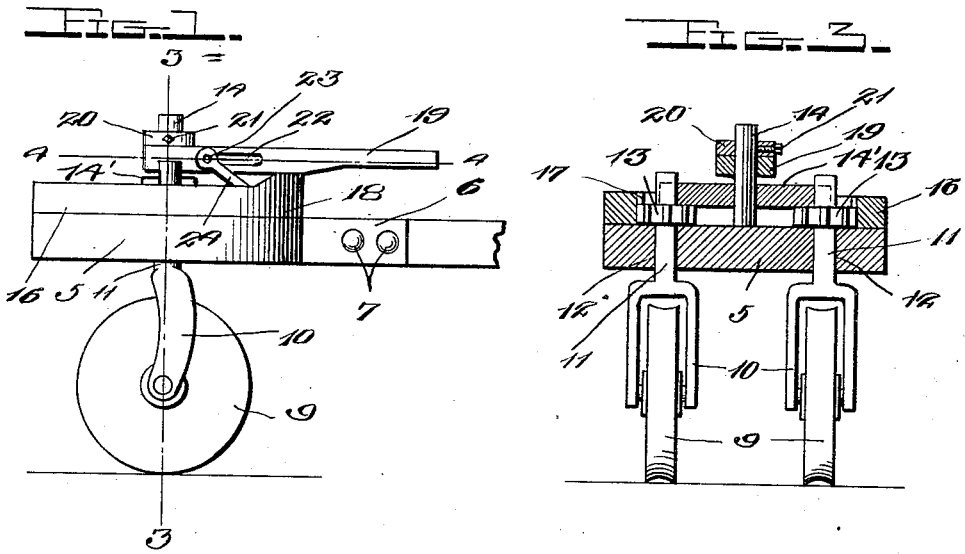
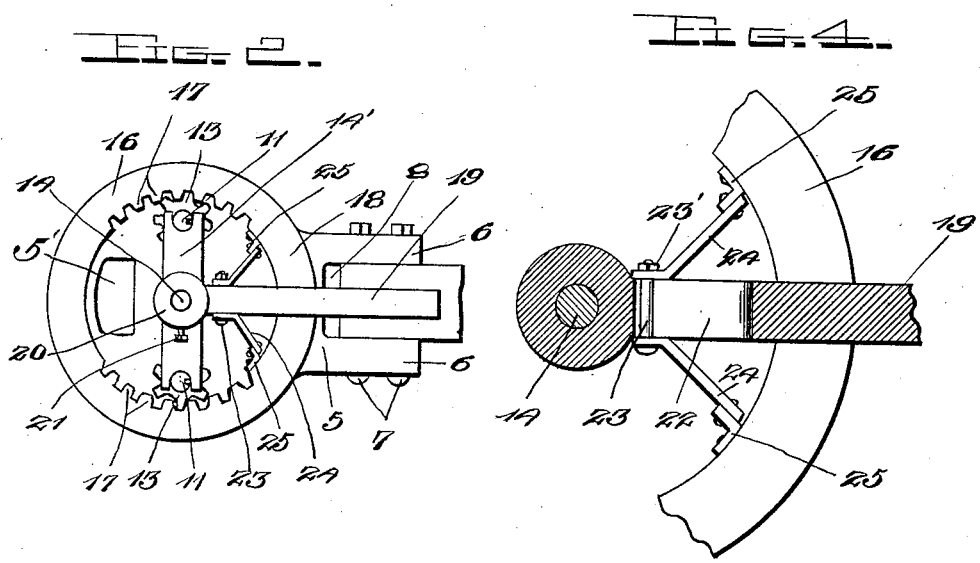
Witnesses
Chas. L. Griesbauer.
A. B. Norton.
Inventor
Fred L. Elder,
By Watson E. Coleman
Attorney

UNITED STATES PATENT OFFICE.

FREDRICK L. ELDER, OF DAYTON, WASHINGTON.

STEERING MECHANISM.

1,050,114.   Specification of Letters Patent.   Patented Jan. 14, 1913.

Application filed February 24, 1912. Serial No. 679,740.

*To all whom it may concern:*

Be it known that I, FREDRICK L. ELDER, a citizen of the United States, residing at Dayton, in the county of Columbia and State of Washington, have invented certain new and useful Improvements in Steering Mechanism, of which the following is a specification, reference being had to the accompanying drawings.

This invention relates to improvements in steering mechanism which is particularly designed for application to the rearwardly extending tongue of headers, push binders and similar field machines which are pushed over the ground by the horses attached thereto whereby the machine will be properly supported upon a soft, hilly or uneven ground surface.

The invention has for its primary object the provision of a double wheeled truck and means whereby said wheels may be easily and quickly turned to position the same at an angle with relation to the line of movement of the machine by a minimum of effort upon the part of the operator.

A further and more specific object of the invention is to provide a double wheeled vehicle truck, and means to simultaneously and positively turn said wheels.

A still further object of the invention is to provide a pair of truck wheels each being mounted upon the lower end of a vertically disposed spindle, a bearing for said spindles adapted to be secured to the tongue of the vehicle, pinions on said spindles, a steering wheel rotatably mounted upon the bearing and having diametrically opposed series of teeth to mesh with said pinions, and an operating lever pivotally mounted at one end upon the bearing and adjustably connected to said steering wheel whereby said lever may be vertically adjusted with relation thereto.

With the above and other objects in view, the invention consists of the novel features of construction, combination and arrangement of parts hereinafter fully described and claimed, and illustrated in the accompanying drawings, in which—

Figure 1 is a side elevation of my improved truck showing the same applied to the end of a vehicle tongue; Fig. 2 is a top plan view thereof; Fig. 3 is a section taken on the line 3—3 of Fig. 1; and Fig. 4 is a horizontal section taken on the line 4—4 of Fig. 1.

Referring in detail to the drawing 5 designates a casting upon which the truck wheels are mounted, said casting including the parallel arms 6 which are adapted to receive between them the end of a vehicle tongue T and are rigidly secured thereto by means of a plurality of bolts 7 which are disposed transversely through coinciding openings in the arms 6 and the tongue. The outer end or body portion of the casting 5 is of substantially circular form in plan and is provided with an opening 8 preferably in line with the vehicle tongue for a purpose which will be more fully apparent from the following description.

The truck wheels 9 are each mounted between the arms of a fork or yoke 10 formed upon the lower end of a vertically disposed spindle 11. These spindles are loosely mounted in openings 12 provided in the body portion of the casting 5 at diametrically opposite points. When the truck is used upon agricultural machines, the wheels 9 are preferably peripherally grooved so that they are prevented from sinking into the soil. The upper ends of the spindles 11 project above the body of the casting 5 and have fixed thereon the cogs or pinions 13. A perpendicular cylindrical standard 14 is fixed at its lower end centrally in the casting 5 and has secured thereon in spaced relation to the upper surface of said casting a transversely disposed bar or arm 14' which extends upon opposite sides of said standard and is provided in its ends with the notches 15 to receive the upper ends of the wheel spindles 11. The pinions 13 are preferably keyed upon said spindles and the bar 14 being disposed above the same prevents longitudinal movement of said pinions upon the spindles.

A steering wheel 16 is mounted upon the upper surface of the casting 5 and this steering wheel is in the form of an annulus which is provided with the diametrically opposed internal series of teeth 17 to mesh with the respective pinions 13. This annulus is provided with a cam portion 18. An operating lever 19 extends over this cam portion of the annulus and has one of its ends loosely mounted upon the standard 14. This operating lever is adapted to be vertically adjusted upon the standard 14 so that the same may be conveniently manipulated by the operator and the same is held against upward movement upon said standard by means of a collar 20 which is adjustably fixed upon said standard by means of a set screw 21.

The lever 19 between the standard 14 and the cam portion 18 of the steering wheel is provided with a transverse longitudinal slot 22 in which a bolt 23 is loosely disposed. Upon opposite ends of this bolt the upper ends of the inclined brace rods or bars 24 are loosely engaged. These brace bars extend from opposite sides of the lever 19 outwardly and downwardly and are pivotally mounted at their lower ends upon the ears 25 which are fixed to the inner wall of the steering wheel 18. When the lever 19 is in its lowermost position as shown in Fig. 1, the same rests upon the cam portion 18 of the steering wheel so that the end of said lever on the standard 14 does not contact with the arm or bar 14', thus eliminating friction thereon when the steering wheel is turned. When the lever 19 is raised above the steering wheel, the nut 23' on one end of the bolt 23 is first loosened so as to permit said bolt to slide freely in the slot 22 of said lever. Thus when the lever is raised the bolt will move rearwardly in said slot, thereby changing the angular disposition of the brace bar 24 with relation to said lever. After the lever has been adjusted to the proper height, the nut 23' is again tightened to clamp the free ends of the brace bars against the opposite sides of said lever and the collar 20 is rigidly fixed upon the standard 14 and in engagement with the operating lever. By providing the opening s' in the body of the bearing for the truck wheels, dirt accumulating upon the top of the bearing and within the annulus may find an outlet therethrough so that the same will not interfere with the proper engagement of the pinions with the teeth carried by the annulus.

From the foregoing the operation of my improved vehicle truck will be clearly understood. By providing the pinions on the upper ends of the truck wheel spindles, and the steering wheel or annulus of relatively great diameter, it will be obvious that but a slight movement of the operating lever 19 is required in order to position the truck wheels at the desired angle with relation to the line of movement of the machine so as to guide the same. As shown in the drawing there are a sufficient number of teeth in each series on the inner wall of the steering wheel to turn the truck wheels to any position within a complete circle, the operating handle moving through an arc of 90°. As the wheels are turned simultaneously and to the same extent, it will be seen that they are at all times maintained in relative parallel positions irrespective of the angle at which they are disposed with relation to the vehicle tongue. In the use of my improved truck upon heavy agricultural vehicles such as threshers and binders, it has been found that the provision of the double wheel truck admits of a better distribution of weight upon the supporting wheels and lessens the friction. As the wheels are also disposed upon opposite sides of the longitudinal median line of the vehicle tongue, they provide a firm support therefor and as the weight of the tongue is equally divided between the wheels, the depth to which the wheels will sink in the ground is reduced to a minimum. By means of my improved truck such cumbersome vehicles may be easily steered and their direction of movement quickly changed in order to avoid obstacles. Owing to the fact that comparatively few elements are employed in the construction of the truck and they are all of simple form, it will be appreciated that the device is extremely strong and durable and may be manufactured at comparatively small cost.

While I have shown and described the preferred form and construction of the various elements, the invention is susceptible of considerable modification without departing from the essential feature or sacrificing any of the advantages thereof.

Having thus described the invention what is claimed is:—

1. In an attachment for push binders and similar machines, a steering device mounted upon the vehicle tongue and comprising a pair of wheels having vertically disposed spindles, an annulus within which the upper ends of said spindles are disposed, means for rotating said annulus, and means arranged on the wheel spindles with which said annulus co-acts to rotate the spindles and angularly position the truck wheels with relation to the line of movement of the vehicle.

2. In an attachment for push binders and similar machines, a steering device mounted upon the vehicle tongue and comprising spaced truck wheels having vertically disposed spindles, a bearing in which said spindles are rotatably mounted, said spindles extending above the bearing, pinions fixed upon the upper ends of the spindles, an annulus movably mounted upon the bearing, series of teeth formed upon the inner wall of the annulus at diametrically opposite points to mesh with the respective pinions, and means for rotating the annulus to simultaneously turn said truck wheels and angularly position the same with relation to the line of movement of the vehicle.

3. In an attachment for push binders and similar machines, a steering device mounted upon the vehicle tongue and comprising spaced truck wheels having vertically disposed spindles, a common bearing for said spindles in which the same are rotatably mounted, said spindles extending above the bearing, a pinion arranged on each of said spindles, a retaining bar engaged with the upper ends of the spindles and disposed over said pinions, and manually operable means mounted upon the bearing and co-acting with the pinions to simultaneously turn the truck wheels and position the same at an angle with relation to the line of movement of the vehicle.

4. In an attachment for push binders and similar machines, a steering device mounted upon the vehicle tongue and comprising spaced truck wheels having vertically disposed spindles, a bearing in which the spindles are rotatably mounted, pinions arranged on said spindles, an annulus provided upon its inner wall with diametrically opposed series of teeth to mesh with the respective pinions, an operating lever to rotate said annulus and simultaneously turn the wheels to position the same at an angle with relation to the line of movement of the vehicle, said lever being vertically adjustable, and means for holding the lever in its adjusted position.

5. In an attachment for push binders and similar machines, a steering device mounted upon the vehicle tongue and comprising spaced truck wheels having vertically disposed spindles, a common bearing in which the spindles are rotatably mounted, a pinion on each of said spindles, a movable steering member mounted upon the bearing and co-acting with the pinions to simultaneously turn the wheels at an angle with relation to the line of movement of the vehicle, and an operating lever adjustably connected to said steering member for movement in a vertical plane with relation thereto whereby the position of said lever may be varied to suit the convenience of the operator.

6. In an attachment for push binders and similar machines, a steering device mounted upon the vehicle tongue and comprising spaced truck wheels having vertically disposed spindles, a common bearing in which the spindles are rotatably mounted, a pinion on each of said spindles, an annulus movably mounted upon the bearing and having diametrically opposed series of teeth on its inner wall to mesh with the respective pinions, a standard centrally fixed in the bearing, a transverse bar on said standard disposed above the pinions to retain the same on the spindles, an operating lever loosely mounted upon said standard at one end, means adjustable upon the standard to prevent vertical movement of the lever thereon, and a plurality of adjustable braces connecting said lever to the annulus whereby the lever is held in an adjusted position with relation to said annulus.

7. In an attachment for push binders and similar machines, a steering device mounted upon the vehicle tongue and comprising a truck wheel having a vertically disposed spindle, a bearing for said spindle, a pinion on the spindle, an annulus movably mounted upon the bearing and provided with internal teeth to mesh with the pinion, a standard fixed in the bearing, an operating lever loosely engaged on the standard at one of its ends, an adjustable collar on the standard to prevent vertical movement of the lever, and a pair of inclined brace bars pivotally connected to the inner wall of said annulus and movably connected to said operating lever whereby the lever is held in an adjusted position with relation to the annulus.

In testimony whereof I hereunto affix my signature in the presence of two witnesses.

FRED. L. ELDER.

Witnesses:
LEON B. KENWORTHY,
NELLIE DORR.

---

Copies of this patent may be obtained for five cents each, by addressing the "Commissioner of Patents, Washington, D. C."